United States Patent [19]

Herron et al.

[11] Patent Number: 5,110,505
[45] Date of Patent: May 5, 1992

[54] SMALL-PARTICLE SEMICONDUCTORS IN RIGID MATRICES

[75] Inventors: Norman Herron; Ying Wang, both of Wilmington, Del.

[73] Assignee: E. I. Du Pont de Nemours and Company, Wilmington, Del.

[21] Appl. No.: 315,626

[22] Filed: Feb. 24, 1989

[51] Int. Cl.$^5$ ............................................... H01B 1/06
[52] U.S. Cl. .................... 252/518; 252/520; 252/521
[58] Field of Search ............ 252/501.1, 518, 520, 252/521; 428/209, 210, 432, 688, 689; 350/355, 356, 362, 360; 357/8, 10, 23.2, 29, 30, 32

[56] References Cited

U.S. PATENT DOCUMENTS

| | | | |
|---|---|---|---|
| 4,569,891 | 2/1986 | Shimizu et al. | 252/501.1 |
| 4,601,965 | 7/1986 | Ide | 252/501.1 |
| 4,658,087 | 4/1987 | Fong | 252/501.1 |
| 4,701,394 | 10/1987 | Inoue et al. | 252/501.1 |
| 4,737,429 | 4/1988 | Mort et al. | 252/501.1 |
| 4,738,798 | 4/1988 | Mahler | 252/518 |
| 4,816,183 | 3/1989 | Bates | 252/518 |

OTHER PUBLICATIONS

Mahler, Inorganic Chem., vol. 27, No. 3, 1988, pp. 435-436.
Rajh et al., Chemical Physics Letters, vol. 143, No. 3, 1988, pp. 305-307.
Roy et al., in "Better Ceramic through Chemistry", Materials Res. Soc. Symp., vol. 32, Ed. J. C. Brinker et al., Elsevier, 1984.
Kuczynski et al., J. Phys. Chem., vol. 89, 1985, pp. 2720-2722.
Rustagi et al., Optics Letters, vol. 9, No. 8 (1984), pp. 344-346.

Primary Examiner—Josephine Barr

[57] ABSTRACT

Nonlinear optical materials comprising porous glass, the pores of which contain a semiconductor material and a polymer.

9 Claims, 2 Drawing Sheets

SMALL-PARTICLE SEMICONDUCTORS IN RIGID MATRICES

FIELD OF THE INVENTION

This invention relates to small-particle semiconductors immobilized in the pores of a glass matrix.

BACKGROUND OF THE INVENTION

The electronic and optical properties of semiconductors are known to be dependent on the size of the semiconductor particles. For example, there is a minimum size which the particles must exceed before light absorption occurs at the bulk bandgap (i.e., before the polymolecular cluster becomes a semiconductor). The onset of bulk semiconducting properties of CdS has been estimated to occur for particles whose diameters exceed 60 Å. For PbS, the band gap shifts to higher energy as the semiconductor cluster size decreases, and eventually converges to the transition energy of the first excited state of the PbS molecule; bulk semiconducting properties appear for particles whose diameters exceed 150 Å.

The preparation of small particle semiconductors has been pursued in an attempt to exploit the altered electronic and optical properties of these materials, relative to bulk semiconductors. However, the preparation of extremely small particulate semiconductors is often difficult and seldom applicable to a wide range of semiconductor compositions. Some semiconductors have been prepared and studied in the gas phase, low-temperature matrices, reversed micelles, surfactant vesicles, bilayer lipid membranes, clays and as colloid suspensions in solvents containing various surfactants to maintain the dispersions. However, the small-particle semiconductors prepared by these methods may be intrinsically unstable towards aggregation or difficult to incorporate into an electronic or optical device. For a useful device, the small-particle semiconductor should be incorporated in a solid, preferably transparent, medium which can be modified by standard fabrication techniques and which can provide an inert or protective environment for the reactive semiconductor material.

In one approach, Cd, S and Se have been added to the standard ingredients of normal glass to prepare CdS or $CdS_xSe_{1-x}$ glass cutoff filters by standard melt procedures. Glasses of this type are commercially available as long-wavelength-pass optical filters, with several values for x. Nonlinear optical effects have been reported in these glasses, but the high temperatures and strongly oxidizing conditions used to prepare these glasses severely limit the applicability of this technique to other semiconductor compositions.

Mahler, *Inorganic Chem.*, Vol. 27, Number 3, 1988, pp. 435–436, discloses additional preparative methods, including metathesis in microemulsion, gas-solid reactions on high surface area silica, synthesis within the channels of perfluorocarbon sulfonic acid membranes, and generation of semiconductor particles within polymer films. In particular, ethylene-15% methacrylic acid copolymer (E-MAA) was shown to provide good mechanical and optical properties and confer high kinetic stability Rajh et al., *Chemical Physics Letters*, Vol 143, No. 3, 1988, pp. 305–307, disclose a method for incorporating quantized particles of colloidal semiconductors in transparent silicate glasses by mixing aqueous colloidal dispersions of the semiconductor with tetramethoxysilane (TMOS), accelerating the polymerization of the silicon alkoxide by the addition of $NH_4OH$, and drying the resulting gel over a period of months. They also disclose a method for producing colloidal glasses by first incorporating metal ions, and then, after drying to about one-half the original volume, adding the appropriate anions for precipitating the particles via gaseous $H_2S$ or $H_2Se$.

Roy et al., in "Better Ceramics Through Chemistry", Materials Res. Soc. Symp., Vol. 32, Ed. J. C. Brinker, D. E. Clark, D. R. Ulrich, Elsevier, 1984, disclose the inclusion of CdS and AgX (X=Cl, Br, I) in sol-gel monoliths by mixing a tetraethoxysilane/ethanol solution with an aqueous solution of the heavy metal ion.

Kuczynski et al., *J. Phys. Chem.*, Vol. 89, 1985, pp. 2720–2722, disclose the preparation of CdS in porous Vycor® glass by soaking cleaned porous glass in a $CdCl_2$ solution, drying the glass under vacuum and then immersing the impregnated sample in a sodium sulfide solution.

The nonlinear optical properties of semiconductors such as degenerate four-wave mixing, optical bistability and phase conjugation have been reported (Rustagi et al., *Optics Letters*, Vol. 9, No. 8 (1984), pp. 344–346, and reference cited therein). Rustagi et al., describe an experimental arrangement for measuring degenerate four-wave mixing of visible radiation in a borosilicate glass doped with the mixed semiconductor, $CdS_xSe_{1-x}$.

The materials provided by the prior art, in which small-particle semiconductor particles are imbedded in porous glass or in a polymer film, are unsuitable for many electronic and optical applications The porous glass compositions are fragile and cannot be machined or polished by the techniques used for standard optical glass. In general, the polymer/semiconductor compositions lack the thermal stability or high optical quality necessary for most electronic and optical applications. For example, it is difficult to make high-quality optical fibers from the polymer/semiconductor composites.

It is an object of the present invention to provide a chemically and mechanically stable dispersion of small semiconductor particles in an optically transparent and mechanically robust rigid matrix. Such materials are expected to have faster optical nonlinearity than bulk semiconductors. Wavelength tuning could be achieved conveniently by controlling the size and concentration of the semiconductor particles. It is a further object of the present invention to provide materials for generating third order nonlinear optical effects.

SUMMARY OF THE INVENTION

These objects are achieved by the present invention, which provides an article of manufacture consisting essentially of porous glass, the pores of which contain a semiconductor and a polymer. The invention also provides materials for generating third order nonlinear optical effects

DETAILED DESCRIPTION OF THE INVENTION

Figure 1:
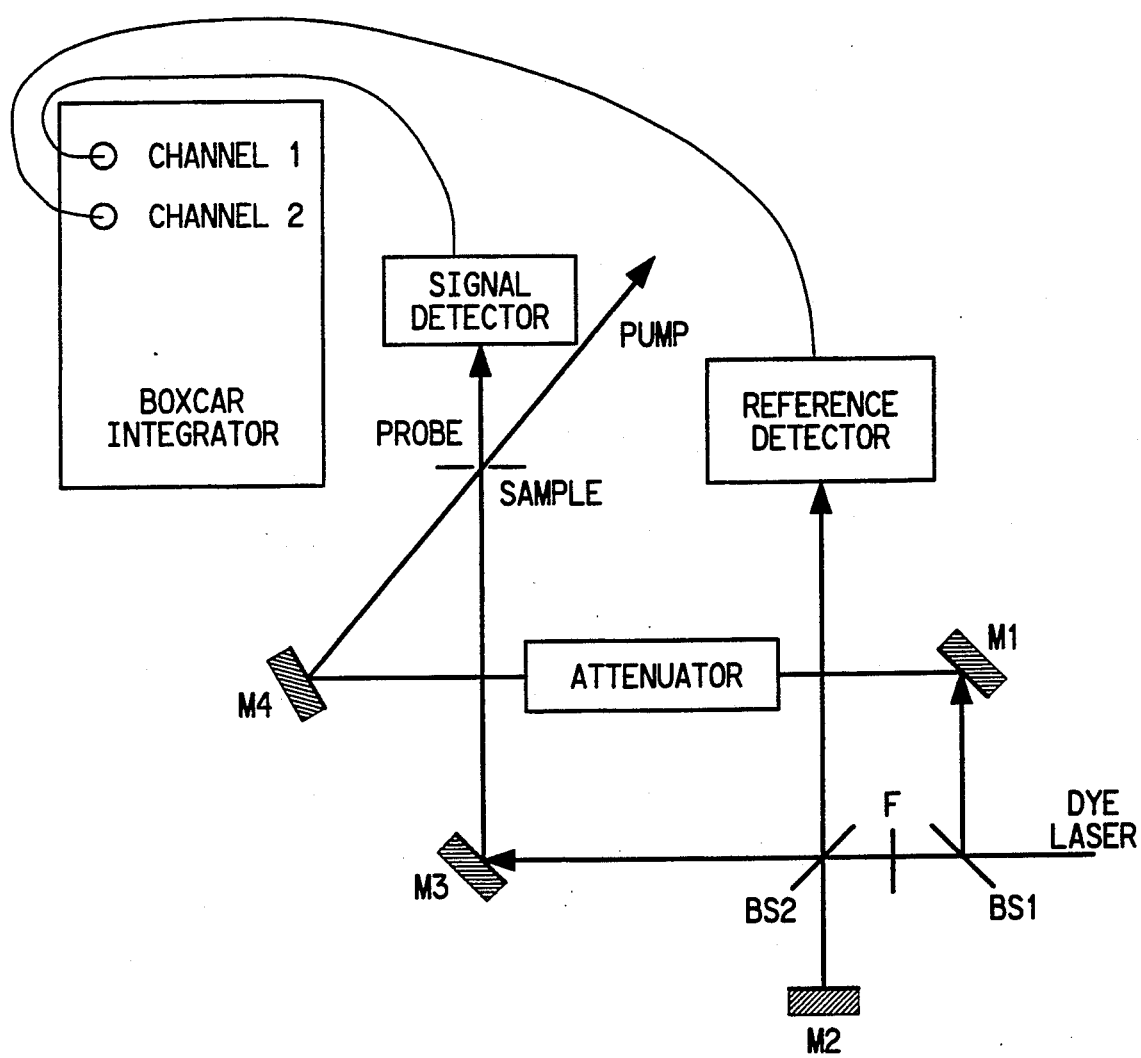
FIG. 1 is a schematic diagram of a Pump Probe Apparatus utilized in Absorption Bleaching Measurements according the present invention.

Suitable porous glasses are amorphous matrix materials with large (10–500 Å), interconnected pores and channels, which optionally may be filled with readily displacable organic or inorganic compounds, e.g., organic solvents, water, or inorganic salts. A suitable porous glass is the glass sold under the trademark Vycor ® (Corning Glass Works, Corning, N.Y.). Suitable porous glasses can also be prepared by the hydrolysis of precursor materials, followed by drying of the resulting gel. The pore size of glasses derived from sol gels can be controlled by the choice of solvents and by the pH of the hydrolysis conditions. Suitable simple glasses include $SiO_2$, $GeO_2$, $TiO_2$, $Y_2O_3$, and $ZrO_2$. Suitable multicomponent glasses include $SiO_2$—$BaO$, $SiO_2$—$B_2O_3$, $SiO_2$—$B_2O_3$—$Na_2O$, $SiO_2$—$Na_2O$, $SiO_2$—$K_2O$, $SiO_2$—$GeO_2$, $Si$—$Al_2O_3$, $SiO_2$—$TiO_2$, $SiO_2$—$Y_2O_3$, $Al_2O_3$—$GeO_2$, $Al_2O_3$—$ZrO_2$, $TiO_2$—$ZrO_2$, $ZrO_2$—$SiO_2$, $PbO$—$La_2O_3$—$ZrO_2$—$TiO_2$. The preparations of these simple and multicomponent porous glasses by sol-gel routes are well known in the art. Porous glasses may also be prepared by the gellation of colloidal silica (e.g., Ludox ®, Du Pont Company) at high pH (pH 9), followed by drying of the resulting gel. The preferred glass is $SiO_2$.

As used herein, the expression "semiconductor material" refers to material that in bulk has electrical conductivity intermediate to that of an insulator and a metal, or a band-gap between about 0.2 and 4 volts. Semiconductor materials suitable for the present invention are known in the art. The semiconductor material may be selected from the group of cations consisting of $Cd^{+2}$, $Zn^{+2}$, $Pb^{+2}$, $Cu^{+2}$, $Ga^{+3}$, $In^{+3}$, and $Ti^{+4}$ in combination with at least one anion selected from the group consisting of $S^{-2}$, $Se^{-2}$, $O^{-2}$, $I^{-}$, $P^{-3}$, $Sb^{-3}$, and $As^{-3}$. Preferably, the semiconductor is selected from the group consisting of CdS, CdSe, ZnS, ZnSe, PbS, PbSe, $PbI_2$, $TiO_2$, $In_2O_3$; sulfides of gallium, copper or indium; selenides of gallium, copper or indium; phosphides of cadmium, lead or zinc; and arsenides of cadmium, lead or zinc. The CdS, CdSe, ZnS, ZnSe, PbS, PbSe, $PbI_2$, $TiO_2$ and $In_2O_3$ semiconductors listed above exist predominantly as single phase materials, resulting in stoichiometries which are invariant and substantially as written (i.e., 1:1, 1:2 or 2:3). The other semiconductors can exist in more than one phase, resulting in stoichiometries which may vary with sample preparation and treatment. However, these compounds are commonly identified by the dominant stoichiometry: $Ga_2S_3$, CuS, $In_2S_3$, $Ga_2Se_3$, CuSe, $In_2Se_3$, $Cd_3P_2$, $Pb_3P_2$, $Zn_3P_2$, $Cd_3As_2$, $Pb_3As_2$ and $Zn_3As_2$. Hereinafter, these variable stoichiometry semiconductors will also be identified by the dominant stoichiometry, as listed above. The semiconductor material can contain mixtures or solid solutions derived from two or more of the cations listed above. The concentration of the semiconductor in the glass/semiconductor/polymer composite is determined by the amount of metal salt incorporated in the glass/semiconductor composite and ranges from 0.01 to 20 wt. %, based on semiconductor-to-glass ratios. The preferred concentration is 0.1 to 5 wt. %.

It has been found that the band-gap energy of the semiconductor particles in the porous glass depends on the size of the particles, which can be controlled by the method of preparation of the particles and by the time and temperature of annealing. In general, the formation of small particles is favored by the use of the sol-gel technique (described more fully in "Method 1" below) and by brief, low-temperature annealing. Preferably, the particles of semiconductor material have a diameter less than about 500 Å, and more preferably less than about 200 Å. The present compositions exhibit minimum light-scattering and are useful as optical filters and for generating third order nonlinear optical effects.

The void-filling polymer of these compositions can be derived from the polymerization of suitable monomers which have been adsorbed by the porous glass either through diffusion or capillary action. Suitable monomers are those which are small enough to diffuse into and fill the void spaces of the semiconductor-impregnated glass without cracking it or dissolving or reacting with the semiconductor particles. Preferable suitable monomers are those whose polymerization may be controlled by the use of a suitable initiator or by treatment of the monomer-saturated glass with heat, radiation, light or electron beams. Specific suitable monomers include methacrylate esters; acrylate esters; styrene; vinyl acetate; acrylonitrile; methacrylonitrile; vinylidene halides of the formula $CH_2=C(X)_2$, wherein X is, independently, Cl or F; substituted butadienes of the formula $CH_2=C(R)C(R)=CH_2$, wherein each R is, independently, $C_1$ to $C_{10}$ alkyl, Cl or F; acrylamide derivatives of the formula $CH_2=CHCON(R)_2$, wherein each R is, independently, H or $C_1$ to $C_{10}$ alkyl; methacrylamide derivatives of the formula $CH_2=C(CH_3)CON(R)_2$, wherein each R is, independently, H or $C_1$ to $C_{10}$ alkyl; and mixtures thereof. Methacrylate esters and styrene are most preferred. Methacrylates which are useful in this invention include branched alkyl or n-alkyl esters of $C_{1-12}$ alcohols and methacrylic acid, for example, methyl and ethyl methacrylate. Methyl methacrylate is most preferred.

Any one of the known class of azo polymerization initiators is suitable provided it has solubility in the monomer mixture, does not react with or dissolve the semiconductor, and has an appropriate half-life at the temperature of polymerization. "Appropriate half-life", as used herein, is a half-life of about 1–4 hours. Examples of such initiators include without limitation azocumene, 2,2'-azobis(isobutyronitrile), 2,2'-azobis(2-methyl)butanenitrile, and 2-(t-butylazo)-2-cyanopropane. Other soluble non-azo initiators having an appropriate half-life can also be used, including, among others, benzoyl peroxide and lauroyl peroxide.

It is also possible to fill the void-space of the glass/semiconductor composite with a high-melting, inert organic material of appropriate dimensions by partially immersing the glass/semiconductor composite in the melted organic material to wick it into the glass pores. This method will also provide a mechanically robust composite that can be machined and polished, but it may be less thermally stable and less resistant to solvent-leaching than a polymer-filled composite.

In one embodiment, the article of manufacture of the present invention is prepared by adding a pH-controlled solution of silicate glass precursor to an aqueous solution of a metal salt, allowing the mixture to form a gel, drying the gel to form a metal-ion impregnated glass, exposing the dried gel to gaseous $H_2S$ or $H_2Se$ to form semiconductor particles in the porous glass, filling the remaining void space of the glass with monomer and polymerizing the monomer to form the glass/polymer/semiconductor composite of the invention. Alternatively, a piece of porous glass can be partially immersed in a solution of metal ion and then the solution-saturated glass dried to give the metal-ion impregnated glass. After the gas treatment described above, the pores are filled with monomer, and the monomer polymerized as before. In a third variant, the metal-ion impregnated glass is exposed to a solution of the appropriate anions to form the semiconductor particles in the porous glass.

Glass/semiconductor composites can be prepared by any of the three routes outlined above by omitting the impregnation with monomer and initiator. However, these materials, which fall outside the scope of the present invention, are very sensitive to both atmospheric moisture and to liquids which can easily impregnate the still-open pores, causing clouding and cracking. These materials are very fragile and may be polished only by hand using dry techniques. They also exhibit poor optical properties.

In contrast, the glass/semiconductor/polymer composites of the invention have mechanical properties similar to normal silicate glasses. They can be cut, machined and then polished by standard ceramic wet polishing techniques. The optical properties of these composites are comparable to those of standard optical glasses. They are unaffected by atmospheric moisture or most polar or nonpolar organic solvents. However, prolonged exposure to solvents which are known to dissolve the imbedded polymer may cause some leaching of the polymer. Similarly, exposure to strong bases may leach some of the glass from silicate glass composites. They are thermally stable to the decomposition point of the imbedded polymer.

The glass/semiconductor/polymer composites of the invention can be formed in a variety of shapes. Disks, plates, rods, etc. can be fashioned by using appropriately shaped forms for the sol-gel, and subsequent cutting and polishing the glass/semiconductor/polymer composite. Fibers can also be drawn from the sol-gel solution before drying and polymer impregnation.

Articles of manufacture in accordance with the present invention are useful as optical filters such as narrow band-pass, UV cut-off and long wavelength pass filters. In general, the glass matrix will be preformed into the shape desired for the filter, and the semiconductor material and polymer will be added as described above. The glass will then be polished to produce a filter with the desired optical properties. The use of such filters is well-known in the art.

The present invention is further described in the following Examples, wherein all parts and percentages are by weight and degrees are Celsius. Particle sizes in the examples were determined by line-broadening of the X-ray diffraction pattern. In some cases, maximum particle sizes were estimated from measurements of the band-gap energy. A value for the band-gap energy greater than that observed for the bulk material indicates the presence of particles having a diameter of less than about 500 Å.

EXAMPLES

General Procedures

Preparation of glass/semiconductor/PMMA composites

Method 1: Tetraalkylorthosilicate (0.1 mol) is diluted with methanol (0.75 mol) and/or formamide (0.25 mol). Use of methanol/formamide mixtures leads to glasses with larger pores, but the drying times are also significantly increased. If desired, the resulting solution may be acidified with nitric acid to decrease the pore size of the final glass. This mixture is added to a stirred solution containing the desired amount of $M(NO_3)_x$ (M = Cd, Pb, Zn, Cu, In, Ga, Ti; x = 2, 3) dissolved in distilled water (1 mol). The resulting mixture is freely fluid at this stage if pH <10 and is poured into vials to gel. The vials can be made of any inert material (e.g., glass, polyethylene, polystyrene), but polymer or polymer-coated vials are preferred because the sol glass sticks to glass vials and may shatter as it shrinks. The vial is capped and heated to about 60° C. for about 8 hours, or until a stiff clear gel results. The vial is uncapped and the gel is dried in the vial in flowing air at about 60° C. for about 24 hours, or until it shrinks to about ½ its original volume. The partially dried gel is removed from the vial and fully dried in a slow ramp heating process wherein the gel is heated to 450°–500° C. over 24–48 hours in rapidly flowing (200 cc/min) oxygen or air.

A colorless disk of highly porous glass is obtained, except when M = Cu or In when the glass is pale blue-green or pale yellow, respectively. The glass at this stage is pure silica containing uniformly dispersed metal ions (M = Cd, Pb, Zn, Cu, Ga) inside a very porous and fragile framework. When M = Ti or In, the metal oxides, $TiO_2$ and $In_2O_3$, present in the glass at this stage are themselves semiconductors. Typically, the other semiconductor species are prepared from these glasses by evacuation of the glass on a high vacuum line followed by exposure to a gaseous reagent ($H_2S$, $H_2Se$, $PH_3$, $AsH_3$, $SiMe_3I$) while heating the glass in a tube furnace. Semiconductor cluster size, and hence color of the glass, can be controlled by the temperature of the annealing, either during or after reaction with the gaseous reagent.

To protect the semiconductor clusters and maintain dispersion, the porosity of the glass is removed by filling all of the available remaining void volume with polymer. This can be done in an inert atmosphere by partially immersing the glass/semiconductor composite in methylmethacrylate (MMA) containing 1 wt. % VAZO-64 ® (Du Pont) to "wick" the monomer up to completely fill the pores of the glass. The impregnated glass is removed from the MMA/VAZO and heated in an inert atmosphere to about 60° C. for about 8 hours, leading to polymerization of the MMA to give PMMA throughout the glass pores. The use of other monomers may require the use of different initiators or polymerization conditions as described in the prior art.

The dense glass/semiconductor/PMMA composite may be cut and polished as if it were a normal piece of silica glass and has no residual porosity.

Method 2: Porous sol-gel glass prepared as described in Method 1 (except omitting the metal nitrate salt) or commercial porous glass is partially immersed in a solution (preferably a highly mobile organic solvent) in which is dissolved the desired metal ion salt (nitrate or acetate). The solution is "wicked up" into the glass until the pores are completely filled. The solution-laden glass is then slowly dried using the protocol described in Method 1 for drying wet gels. The solvent and anion are removed by the drying process to leave metal oxide species in the pores of the glass. However, the dispersion of metal species is not as uniform as that obtained in Method 1. The dry glass is then exposed to gaseous reagents and the void spaces filled with polymer as described in Method 1.

Nonlinear Optical Properties of the Composites

A material is said to have third order nonlinearity if its index of refraction, n, depends on the intensity of light, I, $$n = n_0 + n_2 I \quad (1)$$

or $$\Delta n = n_2 I \quad (2)$$

where $n_0$ represents the index of refraction at very low light intensity and $n_2$ is the nonlinear refraction coefficient which measures the magnitude of the nonlinearity. The commonly used unit for $n_2$ in MKS units is $cm^2/KW$.

Another parameter that is often used to characterize third order nonlinearity is $X^{(3)}$, usually expressed in cgs units as esu. Both $n_2$ and $X^{(3)}$ are related through the following formula (see "Optical Bistability: Controlling light with light", H. M. Gibbs, Academic Press, New York, 1987):

$$n_2(cm^2/KW) = \frac{1}{3} \left| \frac{4\pi}{n_0} \right|^2 X^{(3)}(esu) \quad (3)$$

The third order nonlinearity of a material can be further categorized as resonant and non-resonant. Resonant means the laser wavelength overlaps with the absorption band of the material, i.e. the material absorbs the light, and nonresonant means otherwise. In the case of resonant nonlinearity, the absorption coefficient, $\alpha$, of the material depends on the laser intensity, $$\alpha = \alpha_0 + \alpha_2 I \quad (4)$$

or $$\Delta \alpha = \alpha_2 I \quad (5)$$

where $\alpha_0$ represents the absorption coefficient at very low light intensity and $\alpha_2$ is the nonlinear absorption coefficient which also measures the magnitude of the nonlinearity. Both $\Delta\alpha$ and $\Delta n$ are related through the Kramers-Kronig relationship:

$$\Delta n(E) = \frac{c-h}{2\pi^2} P \int^{\infty} \frac{\Delta \alpha(E')}{(E')^2 - E^2} dE' \quad (6)$$

where c is the speed of light, h is Planck's constant, E is the light frequency and P is the Cauchy principal value of the integral:

$$P \int_0^{\infty} = \lim_{a \to 0} \left( \int_0^{E-a} + \int_{E+a}^{\infty} \right) \quad (7)$$

Experimentally, one can measure either $\Delta\alpha$ or $\Delta n$ and obtain all the third order nonlinearity parameters, $\alpha_2$, $n_2$, and $X^{(3)}$ through equations (1)-(7). While for nonresonant nonlinearity, either $n_2$ or $X^{(3)}$ alone is sufficient for characterizing the magnitude of the nonlinearity; an additional parameter, $\alpha_0$, is needed in the case of resonant nonlinearity. This is because the nonlinearity depends on, and is limited by, the absorption coefficient of the material at the laser wavelength. Therefore in the case of resonant nonlinearity, $\alpha_2/\alpha_0$, $n_2/\alpha_0$, and $X^{(3)}/\alpha_0$ are the correct parameters to use for measuring the nonlinearity. One can characterize the nonlinearity by measuring $\Delta\alpha$ with the Pump-probe technique described below and expressing the nonlinearity either as $\alpha_2/\alpha_0$ or $\Delta\alpha/\alpha_0$.

If a material has significant $n_2$ or $\alpha_2$, many third order nonlinear optical phenomena such as optical bistability and phase conjugation (degenerate four-wave mixing) can be demonstrated. Phase conjugation experiments (described in the following section) have been performed on some of the materials of the invention. The phase conjugation efficiency, defined as the intensity ratio of the phase conjugated beam and the probe beam, is also a measure of the nonlinearity. It has contributions from both $n_2$ and $\alpha_2$ and is proportional to:

$$\left[ \left( \frac{2\pi}{\lambda} n_2 \right)^2 + \left( \frac{\alpha_2}{2} \right)^2 \right] \cdot I^2$$

where $\lambda$ is the laser wavelength and I is the intensity of the pump beam. The phase conjugation efficiency depends on the geometry of the optical set-up, the spatial quality of the laser beam, and also the optical quality of the sample. It is therefore not a good universal parameter for comparing the intrinsic nonlinearity of the material.

Laser-induced absorption changes

The change of sample transmission, $I_t$, as a function of the incident laser power was measured by absorption changes using the pump-probe technique. The laser-induced transmission change measures the magnitude and the speed of the optical nonlinearity. The result is expressed as $\Delta OD/OD_0$, where OD is the low-power optical density defined as $-\log(I_t/I_0)$ and $\Delta OD$ is the induced change in optical density.

$$\left[ \frac{\Delta OD}{OD_0} \text{ is equal to } \frac{\Delta \alpha}{\alpha_0} \right].$$

Samples prepared for evaluation were irradiated by a dye laser, using an optical arrangement corresponding to that depicted in FIG. 1. As indicated in FIG. 1, a 10/90 beam splitter 1 (BS1) divided the dye laser pulse into two parts. One part, the strong pump beam, was directed sequentially to a mirror (M1), an attenuator and another mirror (M4). The other beam, a weak probe beam, was directed through a filter (F) and then to a 50/50 beam splitter (BS2). One part of the signal from BS2 was directed to a mirror (M2), which sent the signal back through BS2 and to a detector, providing the reference signal. The other part of the probe beam from BS2 was directed to a mirror (M3). The pump beam (from M4) and the probe beam (from M3) were directed to the sample, and overlapped at the sample spatially and temporally. The intensity of the probe beam transmitted through the sample, $I_t$, was measured by a signal detector and divided by the intensity of the signal from the reference detector by a boxcar integrator to correct for the laser intensity fluctuations. The power dependence of $\Delta OD$ was obtained by measuring the change in intensity of the transmitted beam as a function of the pump beam intensity, where the intensity of the pump beam is adjusted by the attenuator.

Degenerate Four-Wave Mixing (DFWM)

Figure 2:
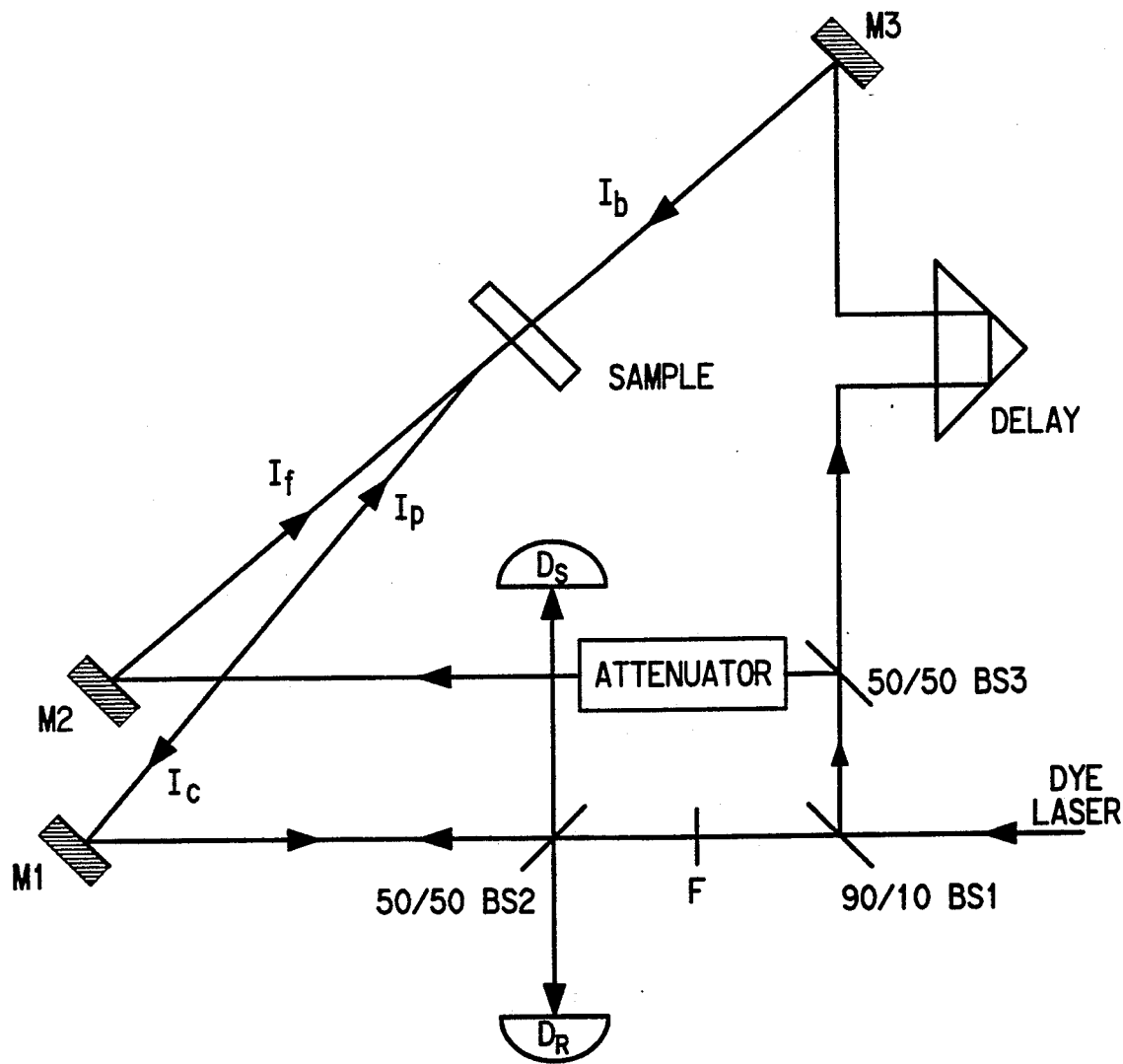
FIG. 2 is a schematic diagram of a Degenerate Mixing Apparatus according the present invention.

Samples prepared for evaluation were irradiated by a dye laser, using an optical arrangement corresponding to that depicted in FIG. 2. As indicated in FIG. 2, a 10/90 beam splitter 1 (BS1) divided the dye laser pulse into two parts. One part, the weak signal from BS1, was directed to a 50/50 beam splitter (BS2), sending a reference beam to the reference detector ($D_R$) and a probe beam ($I_p$) to a mirror (M1). The other part of the signal from BS1 was directed to a 50/50 beam splitter (BS3). Part of this beam, the forward pump beam ($I_f$), was directed to an attenuator and a mirror (M2). The other part of this beam, the backward pump beam ($I_b$), was directed through a delay and then to a mirror (M3). The forward and backward pump beams (from M2 and M3) and the probe beam (from M1) are directed at the sample and overlap there spatially and temporally. The phase conjugated beam ($I_c$) retraces the path followed by $I_p$ to BS2 and is detected by $D_S$. The magnitude of $I_c$ measures the optical nonlinearity of the sample. $I_c$ was divided by the signal from the reference detector to correct for the laser intensity fluctuations. The power dependence of the nonlinearity was measured by adjusting the intensity of the $I_f$ with the attenuator. The time dependence of the nonlinearity was measured by adjusting the arrival time of the $I_b$ with the delay line.

For the samples evaluated in these experiments, the dominant contribution to the nonlinearity is due to laser-induced absorption bleaching and the associated change in refractive index. The pump-probe experiment measures the sample absorption change, and the associated change in refractive index can be obtained through the Kramers-Krönig analysis. The DFWM experiment measures the contribution from both the absorption change and the refractive index change. The observation of large absorption change from the pump-probe experiment can be correlated to the observation of a strong phase-conjugated signal from the DFWM experiment.

EXAMPLE 1

A cadmium-loaded glass disk was prepared as described in Method 1, using 1.00 g of cadmium nitrate dissolved in 18 mL of water, tetramethyl orthosilicate (15 mL), methanol (25 mL) and nitric acid (2 mL). The resulting solution was mixed well and poured into 25 mL polyethylene vials to a depth of about ¼ inch (about 3 mL). After heating and drying, one of the resulting clear cadmium-loaded disks (about 0.35 g) was evacuated to high vacuum ($10^{-3}$ torr) and then exposed to 200 torr $H_2S$. The disk was heated to 100° C. for 15 min in this atmosphere and then for another 15 min under vacuum. After cooling to room temperature, the yellow disk was placed in an inert atmosphere glove box and impregnated with a 1% solution of Vazo-64® in methyl methacrylate (MMA). The MMA-saturated disk was placed in a tightly capped vial and heated in a vacuum oven at 60° C. overnight. The MMA polymerized, giving a dense glass/CdS/polymethylmethacrylate PMMA) composite. An X-ray pattern of the composite shows the presence of crystalline CdS of particle size 40 Å.

The ratios of Cd:S obtained from elemental analyses of CdS-containing composites vary from 1.0 to 1.7, probably as a result of incomplete conversion of $Cd^{+2}$ to CdS.

EXAMPLES 2-21

The procedure substantially as described in Example 1 has also been used to prepare other glass/semiconductor/PMMA composites, as summarized in Table 1. In all cases, the coloration of the glass appears to be very uniform.

The weight of metal salt given is that added to the recipe given in Example 1 above.

TABLE 1

Glass/Semiconductor/PMMA Composites Prepared From Sol Gel Glasses

| Ex. | Semi-Conductor | Metal Salt[a] (Wt. Range Studied) | Anion Source | Color[b] (Range) |
|---|---|---|---|---|
| 1 | CdS | $Cd(NO_3)_2$, 1.0 g (0.025–1.0 g) | $H_2S$ | Yellow (Colorless → Yellow) |
| 2 | PbS[c] | $Pb(NO_3)_2$, (0.025–1.0 g) | $H_2S$ | (Brown → Black) |
| 3 | ZnS | $Zn(NO_3)_2$, 0.1 g | $H_2S$ | Colorless |
| 4 | CuS | $Cu(NO_3)_2$, 0.1 g | $H_2S$ | Green Brown |
| 5 | $Ga_2S_3$ | $Ga(NO_3)_3$, (0.025–0.75 g) | $H_2S$ | Colorless |
| 6 | $In_2S_3$ | $In(NO_3)_3$, (0.025–1.0 g) | $H_2S$ | Yellow |
| 7 | CdSe[d] | $Cd(NO_3)_2$, 1.0 g (0.025–1.0 g) | $H_2Se$ | Yellow (Yellow → Red) |
| 8 | PbSe | $Pb(NO_3)_2$, (0.025–0.5 g) | $H_2Se$ | Black |
| 9 | ZnSe | $Zn(NO_3)_2$, 0.1 g | $H_2Se$ | Yellow |
| 10 | CuSe | $Cu(NO_3)_2$, 0.1 g | $H_2Se$ | Brown → Black |
| 11 | $Ga_2Se_3$ | $Ga(NO_3)_3$, (0.025–0.75 g) | $H_2Se$ | Yellow |
| 12 | $In_2Se_3$ | $In(NO_3)_3$, (0.025–1.0 g) | $H_2Se$ | (Orange → Dp. Red) |
| 13 | $Cd_3P_2$ | $Cd(NO_3)_2$, (0.025–1.0 g) | $PH_3$ | (Colorless → Black) |
| 14 | $Pb_3P_2$ | $Pb(NO_3)_2$, 0.025 g | $PH_3$ | Black |
| 15 | $Zn_3P_2$ | $Zn(NO_3)_2$, 0.1 g | $PH_3$ | Colorless |
| 16 | $Cd_3As_2$ | $Cd(NO_3)_2$, 0.1 g | $AsH_3$ | Black |
| 17 | $Pb_3As_2$ | $Pb(NO_3)_2$, 0.1 g | $AsH_3$ | Black |
| 18 | $Zn_3As_2$ | $Zn(NO_3)_2$, 0.1 g | $AsH_3$ | Yellow |
| 19 | $PbI_2$ | $Pb(NO_3)_2$, 0.1 g | $Me_3SiI$ | Yellow |
| 20 | $TiO_2$ | $Ti(i-OC_3H_7)_4$, 0.1 g | none | Colorless |
| 21 | $In_2O_3$ | $In(NO_3)_3$, 1.0 g | none | Yellow |

[a]The amount of metal salt used for the specific example listed is given immediately following the salt. The numbers in parentheses indicate the weight range of metal salts used in preparing other, similar glass/semiconductor/PMMA composites. These numbers only represent the actual amounts used and are not meant to be limiting.
[b]The colors in parentheses indicate the range of colors actually observed for samples of various metal loadings and annealing conditions. These colors are supplied only as a guide and are not meant to be limiting.
[c]Pb:S = 1.0, as determined by elemental analysis.
[d]Cd:Se = 1.3, as determined by elemental analysis.

EXAMPLE 22

A Vycor®/CdS/PMMA composite was prepared by the procedure described in Method 2. A piece of Vycor® glass (¼ inch × ¼ inch × ¼ inch, Corning Glass Co. 7930 porous Vycor® glass 70±21Å pores) was calcined in flowing oxygen at 500° C. to remove water and trapped organics. The clean, cooled glass was partially immersed in an aqueous solution of $Cd(NO_3)_2$ (1.0 g in 10 mL of water) until the glass pores were filled with solution. The glass was dried in flowing air at 60° C. overnight and then at 450° C. for 24 hours. The cooled, cadmium-loaded glass was then treated with $H_2S$ and MMA as described in Example 1. The resulting composite tends to be unevenly colored, implying an uneven distribution of the semiconductor, CdS.

EXAMPLES 23-25

This procedure has been used to prepare other Vycor ®/semiconductor/PMMA composites, as summarized in Table 2.

TABLE 2

Vycor ®/Semiconductor/PMMA Composites Prepared From Vycor ® Glass

| Ex. | Semi-Conductor | Metal Salt[a] (Wt. Range Studied) | Anion Source | Color[b] (Range) |
|---|---|---|---|---|
| 22 | CdS | $Cd(NO_3)_2$, 1.0 (0.025-1.0 g) | $H_2S$ | Yellow |
| 23 | PbS | $Pb(NO_3)_2$, (0.025-1.0 g) | $H_2S$ | Black |
| 24 | CdSe | $Cd(NO_3)_2$, (0.025-1.0 g) | $H_2Se$ | Red Orange |
| 25 | PbSe | $Pb(NO_3)_2$, (0.025-1.0 g) | $H_2Se$ | Black |

[a]The amount of metal salt used for the specific example listed is given immediately following the salt. The numbers in parentheses indicate the weight range of metal salts used in preparing other, similar glass/semiconductor/PMMA composites. These numbers only represent the actual amounts used and are not meant to be limiting.
[b]The colors in parentheses indicate the range of colors actually observed for samples of various metal loadings and annealing conditions. These colors are supplied only as a guide and are not meant to be limiting.

EXAMPLES 26-29

Table 3 summarizes the resonant $X^{(3)}$ properties of selected glass/semiconductor/polymer composites. In general, the nonlinearities of Examples 26-28 are about one order of magnitude lower than the reference material, $CdS_xSe_{1-x}$ doped glass, at the wavelength studied. The nonlinearity of Example 29 is comparable to that of $(CdS_xSe_{1-x})$-doped glass. $CdS_xSe_{1-x}$ is one of the best $X^{(3)}$ materials known in the art.

TABLE 3

| Ex. | Sample | Wavelength | Laser Power | Rel. Absorbance Change, $\Delta OD/OD_0$ |
|---|---|---|---|---|
| 26 | PbS in sol-gel | 625 nm | 1 $MW/cm^2$ | −6.8% |
| 27 | $In_2S_3$ in sol-gel | 625 nm | 1 $MW/cm^2$ | −6.3% |
| 28 | $In_2Se_3$ in sol-gel | 540 nm | 3.2 $MW/cm^2$ | +5% |
|  |  | 570 nm | 1.9 $MW/cm^2$ | +2.6% |
|  |  | 625 nm | 1.0 $MW/cm^2$ | −5.7% |
| 29 | CdS in sol-gel | 450 nm | 2.8 $MW/cm^2$ | −22% |
| Ref.* | Corning 3-69 Filter | 500 nm | 3 $MW/cm^2$ | −29% |

*The parameters for Corning 3-69 $(CdS_xSe_{1-x})$-doped glass were extracted from Olbright et al., Opt. Letters, 12, 413 (1987).

EXAMPLE 30

Degenerate four wave mixing experiments (optical phase conjugation) were performed on CdS in a sol-gel glass thin film with the set-up shown in FIG. 2. The phase conjugation efficiency was determined to be $1.3 \times 10^{-3}$ of the probe beam, i.e., the intensity of the phase conjugation signal was 0.13% of the probe beam.

What is claimed is:

1. An article of manufacture consisting essentially of porous glass, the pores of which contain a polymer and a semiconductor material comprising at least one cation selected from the group consisting of $Cd^{+2}$, $Zn^{+2}$, $Pb^{+2}$, $Cu^{+2}$, $Ga^{+3}$, $In^{+3}$, and $Ti^{+4}$, and at least one anion selected from the group consisting of $S^{-2}$, $Se^{-2}$, $O^{-2}$, $I^{-}$, $P^{-3}$, $Sb^{-3}$, and $As^{-3}$ provided when the cation is $In^{+3}$ or $Ga^{+3}$ the anion is other than $P^{-3}$, $Sb^{-3}$, or $As^{-3}$.

2. The article of manufacture of claim 1 wherein the semiconductor is selected form the group consisting of CdS, CdSe, ZnS, ZnSe, PbS, PbSe, $PbI_2$, CuS, CuSe, $TiO_2$, $In_2O_3$, $Ga_2S_3$, $In_2S_3$, $Ga_2Se_3$, $Cd_3As_2$, $Pb_3P$ hd 2, $Zn_3P_2$, $Cd_3P_2$, $Pb_3As_2$, $Zn_3As$ 2 and $In_2Se_3$.

3. The article of manufacture of claim 1 wherein the polymer is prepared from at least one monomer selected from the prepared from at least one monomer selected from the group consisting of methacrylate esters; acrylate esters; styrene; vinyl acetate; acrylonitrile; methacrylonitrile; vinylidene halides of the formula $CH_2=C(X)_2$, wherein each X is Cl or F; substituted butadienes of the formula $CH_2=C(R)C(R)=CH_2$, wherein each R independently is $C_1$-$C_{10}$ alkyl, Cl or F; acrylamide derivatives of the formula $Ch_2=CHCON(R)_2$, wherein each R independently is H or $C_1$-$C_{10}$ alkyl; methacrylamide derivatives of the formula $CH_2=C(CH_3)CON(R)_2$, wherein each R independently is H or $C_1$-$C_{10}$ alkyl.

4. The article of manufacture of claim 1 wherein the glass is selected from the group consisting of $SiO_2$, $GeO_2$, $TiO_2$, $Y_2O_3$, $ZrO_2$, $SiO_2$—BaO, $SiO_2$—$B_2O_3$, $SiO_2$—$B_2O_3$—$Na_2O$, $SiO_2$—$Na_2O$, $SiO_2$—$K_2O$, $SiO_2$—$Al_2O_3$, $SiO_2$—$GeO_2$, $SiO_2$—$TiO_2$, $SiO_2$—$Y_2O_3$, $Al_2O_3$—$GeO_2$, $Al_2O_3$—$ZrO_2$, $TiO_2$—$ZrO_2$ and $ZrO_2$—$SiO_2$, PbO—$La_2O_3$—$ZrO_2$—$TiO_2$.

5. The article of manufacture of claim 4 wherein the glass is $SiO_2$.

6. The article of manufacture of claim 1 wherein the monomers are selected from the group consisting of methacrylate esters and styrene.

7. The article of manufacture of claim 6 wherein the monomer is methyl methacrylate.

8. The article of manufacture of claim 1 wherein the concentration of cation in the glass is from about 0.01 to about 20 wt. %.

9. The article of manufacture of claim 8 wherein the concentration is from about 0.1 to about 5 wt. %.

* * * * *